350-96.24 SR
XR 3,315,082
IX 3072R
CROSS REFERENCE SEARCH ROOM
/96

April 18, 1967 W. E. MILROY 3,315,082

TRANSMISSION LINES UTILIZING FIBER OPTICS AND AN ELECTRO-QUENCHABLE PHOSPHOR

Filed Aug. 24, 1962

INVENTOR.
WARREN E. MILROY

BY

ATTORNEYS

3315082
OR IN 250/227

3,315,082

TRANSMISSION LINES UTILIZING FIBER OPTICS AND AN ELECTRO-QUENCHABLE PHOSPHOR

Warren E. Milroy, San Diego, Calif., assignor to the United States of America as represented by the Secretary of the Navy Filed Aug. 24, 1962, Ser. No. 219,821
3 Claims. (Cl. 250—227)

The invention described herein may be manufactured and used by or for the Government of the United States of America for governmental purposes without the payment of any royalties thereon or therefor.

The present invention relates to signal transmission systems and more particularly, to an electro-optical transmission system and specifically, to a transmission system which utilizes fiber optic bundles as transmission links between computers and processing equipment.

As is well known, the computer and/or the processing equipment which is utilized in conjunction with computers is limited by the speed with which data may be transmitted into and out of and between computer units. For example, the computer equipment may be limited by a 4 volts per microsecond rise time in order that undue cross talk on transmitter signals between computers or between computers and processing equipment will not be present. The problem of undue cross talk and ground loops between equipments becomes an unwanted limitation as faster computers come into being. Therefore, it is highly desirable that a transmission system be developed that would allow the computer to utilize its full capability as a high speed data processing means without encountering the heretofor present ground loops and crosstalk.

The present invention in its preferred form may comprise a plurality of contiguous optical paths, each of which is optically isolated from the other so as to be capable of independently transmitting discrete information in the form of light signals, obviating the prior art problem of electrical cross-talk. Each optical path may include light guide means constructed of a light transmitting material and having transducer means affixed at either end; one transducer means is adapted for converting input electrical signals to commensurate signals of light energy, and the other transducer is adapted for converting the signals of light energy to electrical energy after their transmission over the optical path.

The object of the present invention is to provide a signal transmission system which is capable of high operating speeds.

An additional object of the invention is to provide a signal transmission system for use with high speed computer equipment which eliminates crosstalk and ground loops.

A further object of the present invention is to provide a signal transmission system which substantially eliminates the problems incident to rise time.

Another object of the present invention is to provide a signal transmission system which utilizes electro-optical means for transmitting signals between various equipments.

An additional object of the present invention is to provide a signal transmission system for use with computer equipment which is low cost, high speed and requires very little maintenance.

Various other objects and advantages will appear from the following description of the embodiments of the invention, and the novel features will be particularly pointed out hereinafter in connection with the appended claims.

In order to better understand the invention reference is made to the accompanying drawings wherein.

In order to obviate the effect of rise time which in turn initiates the problems of crosstalk and ground loops the present invention substitutes fiber optic bundles for the interconnecting cables between computers and associated equipments. On the ends of the bundles, phosphor transducers are deposited which are activated by electrical signals at the computer and associated equipment. Light signals are conveyed by the fiber optic bundle and at the terminus converted in a terminating phosphor to an electrical signal again.

Figure 1:
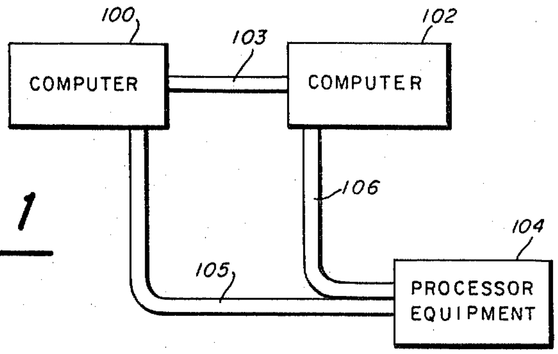
FIG. 1 is a simplified schematic diagram of computer equipments and associated processor equipments.

Such a system is illustrated in FIG. 1 wherein computers 100 and 102 are shown linked by fiber optic bundle 103 and a processor equipment 104 is connected to the computers 100 and 102 by fiber optic bundles 105 and 106 respectively. It is to be understood that the illustration in FIG. 1 is very schematic and is intended to show large blocks wherein the computers 100 and 102 might comprise more than one computer and the processor equipment 104 might comprise a multitude of peripheral units associated with the computers.

Figure 2:
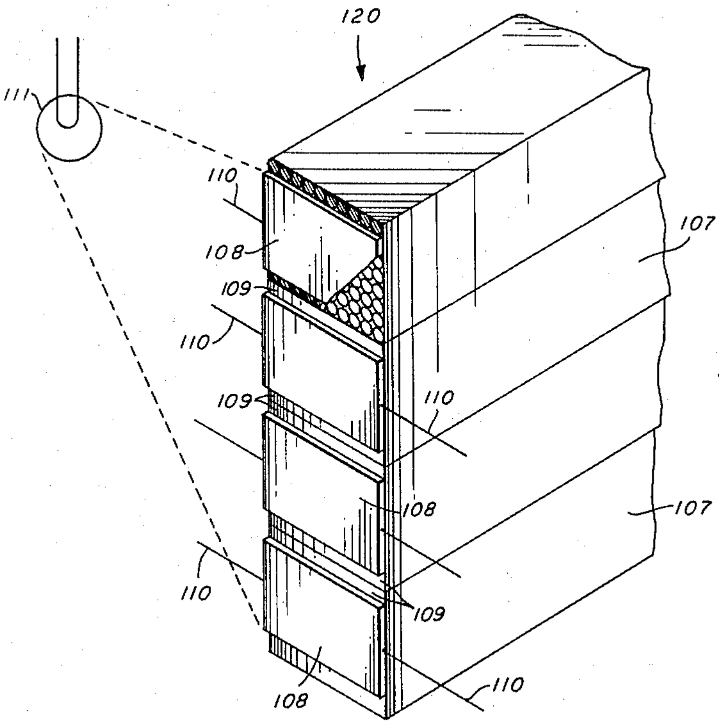
FIG. 2 is a partial cutaway of an embodiment of the invention illustrating the formation of the fiber optic transmission lines.

The transmission lines are formed as shown in FIG. 2. The transmission line 120 is shown as being rectangular in form due to the manner in which the line is made, however, any configuration might be used that is practical.

A plurality of individual fiber optic bundles 107 actually comprise the transmission line 120. Each bundle 107 has deposited on the terminating ends thereof a phosphor transducer as at 108 which may be an EL or EQ phosphor. In some applications it may be desirable for a transducer such as that shown at 108 to be of the photoconductive type as will be explained more fully hereinafter. Between each phosphor transducer 108 is left a blank space 109 to provide an isolation feature. Conducting links 110 are connected to the phosphors 108 in order that the phosphors may be activated and in order that light signals which have been converted to electrical signals may be sensed.

The nature of certain of the fiber optic bundles, as is well understood in the art, is such that light energy directed therein anywhere along their length is transmitted to the ends thereof. Thus, by utilizing suitable phosphors on the initiating and terminating ends of the fiber optic bundles an electrical signal can be converted to a light signal, transmitted down the fiber optic bundle and reconverted to an electrical signal at the terminating end. On the other hand the terminal equipment which might be a processor equipment could also initiate an electrical signal which would be converted to a light signal, transmitted down the fiber optic bundle and reconverted to an electrical signal to be utilized in the computer equipment.

Such is the case in the present invention if an EL phosphor is utilized for the initiating phosphor as at 108 for example. In this example, the voltage at the computer appearing across leads 110 would be used to cause the phosphor 108 to luminesce. The reverse action would take place on the terminal end of the fiber optic bundle 107 in that a photo conducting phosphor 108 would change resistance upon the transmitted light impinging thereon thereby producing a change in voltage level. A suitable EL phosphor for the originating end could be U.S. Radium #3663 Green consisting of zinc sulphide, activated by copper, chlorine or lead. A photodiode phosphor that could be used to convert light energy to an electrical signal might be zinc sulphide.

If an EQ phosphor is used on the initiating end then an ultra-violet light source 111 is provided which causes the EQ phosphors such as cadmium sulphide and zinc sulphide to fluoresce. The D.C. voltage from the computer or other equipment is then impressed upon the leads 110 which causes the output light to diminish or become blank; this phenomenon is referred to as electro-quenching.

Again, on the terminal end a photodiode would be provided which converts the blank into a resistance change in the phosphor transducer thereby producing a changed voltage level.

The two level condition is highly advantageous for use with computer equipment in that the computer is a digital device that operates at voltage levels corresponding to ones and zeros. Therefore the blank and light condition may be used in that a blank might correspond to a zero while a light condition might correspond to a one. In addition the voltage levels ordinarily at the computer correspond to a zero voltage and a —15 volts which again fits in well with the present application.

Through the use of the fiber optics and the phosphor transducers on the ends thereof a transmission system is provided wherein the individual fiber optic bundles are completely isolated one from another and wherein ground loops and crosstalk are eliminated between individual transmission links and between computer equipments. A further advantage lies in the fact that the size of interconnecting cables could be drastically reduced using such a technique in that insulation between various conductors may be completely eliminated.

It will be understood that various changes in the details, materials, steps and arrangements in parts, which have been herein described and illustrated in order to explain the nature of the invention, may be made by those skilled in the art within the principle and scope of the invention as expressed in the appended claims.

What is claimed is:

1. A signal transmission system for use in conjunction with high speed computer equipment comprising;
  - a plurality of contiguous optical paths, each optically isolated for independent transmission of discrete signal information and including light guide means constructed of a light transmitting material and having ends;
  - transducer means physically fixed to said ends of said light transmitting material, the transducer means at one of said ends being adapted for converting electrical signals to light; wherein said transducer means at said one of said ends of said light transmitting material comprises an electro-quenchable phosphor;
  - transducer means at the other of said ends adapted for converting light to electrical signals; and
  - activating means connecting to said transducer means at said one of said ends for activating said transducer means to produce light for transmission.

2. A signal transmission system as set forth in claim 1 wherein said activating means for activating said phosphor transducers comprises a source of electrical signals.

3. A signal transmission system as set forth in claim 1 wherein said phosphor at one end of said light transmitting material comprises a phosphor transducer which is capable of activation by electrical signals to produce light; said transducer at the other end of said light transmitting material comprises a phosphor transducer capable of converting light signals to electrical energy.

References Cited by the Examiner

UNITED STATES PATENTS

| | | | |
|---|---|---|---|
| 2,122,750 | 7/1938 | Nicolson | 250—227 X |
| 2,420,716 | 5/1947 | Morton et al. | 250—227 |
| 2,506,672 | 5/1950 | Kell et al. | 88—1 |
| 2,833,936 | 5/1958 | Ress | 250—227 X |
| 2,907,001 | 9/1959 | Loebner | 250—213 |
| 2,967,664 | 1/1961 | Ress | 250—227 X |
| 3,043,179 | 7/1962 | Dunn | 250—227 X |
| 3,045,223 | 7/1962 | Kapany et al. | 250—227 X |
| 3,051,166 | 8/1962 | Hovnanian | 250—227 X |
| 3,056,031 | 9/1962 | McNaney | 250—227 X |
| 3,091,698 | 5/1963 | McNaney | 250—227 X |
| 3,153,172 | 10/1964 | Ling | 250—227 X |

RALPH G. NILSON, *Primary Examiner.*

ARCHIE R. BORCHELT, FREDERICK M. STRADER, *Examiners.*

E. STRICKLAND, M. A. LEAVITT, *Assistant Examiners.*